Patented July 12, 1938

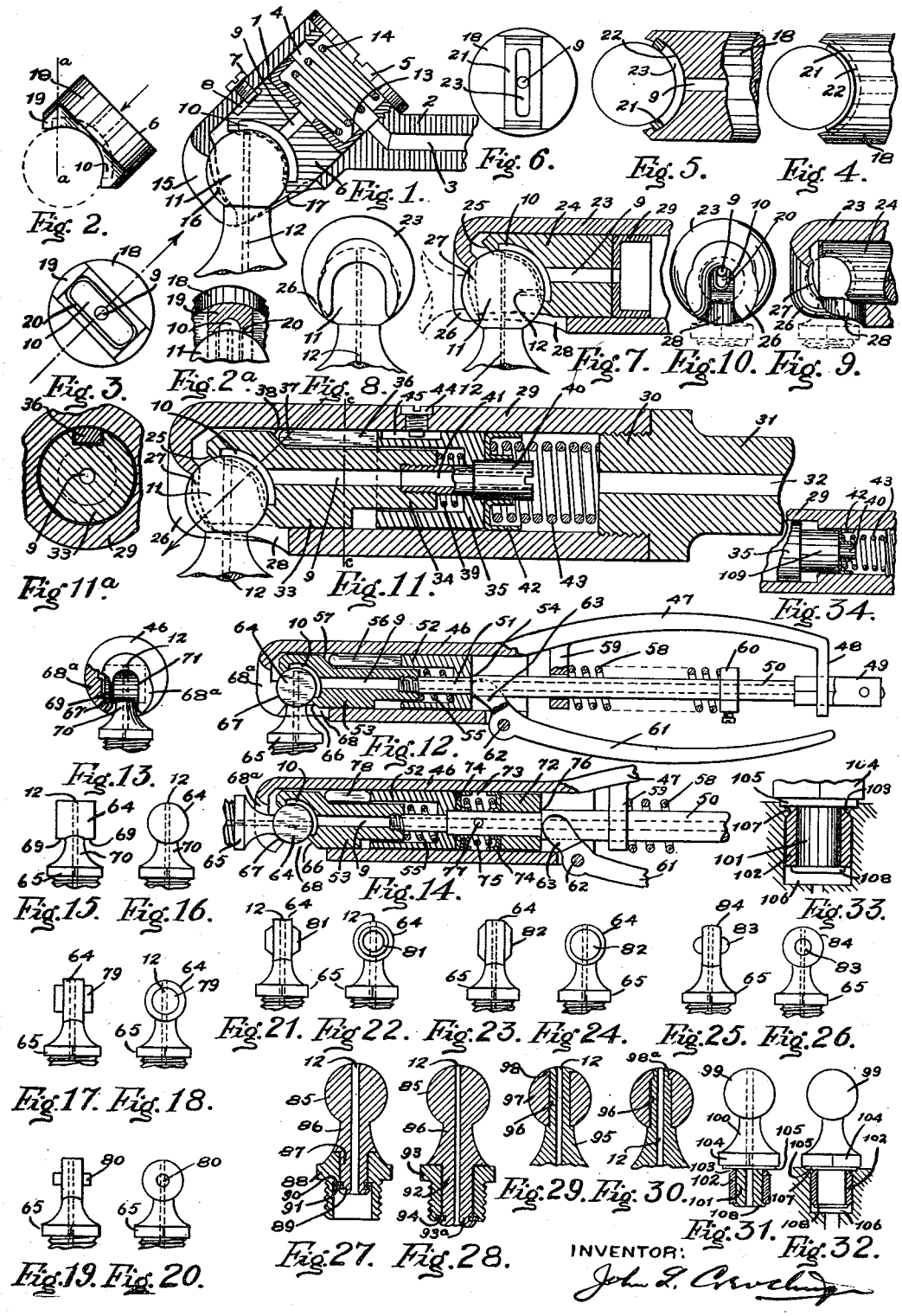

2,123,404

UNITED STATES PATENT OFFICE 2,123,404

LUBRICATING MEANS

John L. Creveling, near Tucson, Ariz.

Application August 24, 1933, Serial No. 686,549
Renewed December 6, 1937

18 Claims. (Cl. 285—143)

My invention pertains to that class of lubricating means wherein fittings, now commonly known in the art as nipples, are connected with parts to be lubricated by suitable ducts and wherein means are provided for engaging the nipples and forcing grease therethrough under high pressure.

An object of my invention is to provide improved means for engaging such nipples and maintaining a fluid-tight connection of the lubricant supply therewith under pressure.

Another object of my invention is to provide means for engaging various types of nipples and also nipples to cooperate therewith.

Other objects will be plain from the following specification and drawing forming a part thereof.

In the drawing:

Fig. 1 is a partial section and partial elevation showing a type of nipple now in use, engaged by a fitting embodying an element of my invention.

Fig. 2 is a side elevation of one of the members shown in section in Fig. 1.

Fig. 2ª is a fragmentary view, partly in section and partly in elevation, showing a section of a portion of the member of Fig. 2, taken upon the line a—a, as viewed from the left.

Fig. 3 is a plan of the member of Fig. 2 as viewed in the direction of the arrow.

Fig. 4 is a side elevation of a modified type of member which may be used in place of the member shown in Fig. 2.

Fig. 5 is a section of the member of Fig. 4.

Fig. 6 is an end elevation of the member of Figs. 4 and 5, viewed from the left.

Fig. 7 is a section of a fitting including an element of my invention in operative relation to a ball-head fitting, a portion of which is shown in vertical elevation in full lines and in horizontal elevation in dotted lines.

Fig. 8 is an end elevation of the structure of Fig. 7, as seen from the left.

Fig. 9 is a fragmentary view of a fitting similar to that of Fig. 7, showing a portion in section and a portion in elevation, with the ball-head fitting indicated in dotted lines.

Fig. 10 is an end elevation of the structure indicated in Fig. 9.

Fig. 11 is a longitudinal section of one type of fitting including elements of my invention and an elevation of a portion of a ball-head fitting operatively engaged thereby.

Fig. 11ª is a section of the fitting of Fig. 11, taken on the line c—c and viewed from the left.

Fig. 12 is a partial section and partial elevation of a modified form of fitting including elements of my invention, and a vertical elevation of a novel type of nipple engaged thereby.

Fig. 13 is a partial end elevation and partial section of the structure of Fig. 12.

Fig. 14 is a partial section and partial elevation of another modified form of fitting embracing elements of my invention, and a horizontal elevation of a novel nipple engaged thereby.

Fig. 15 is a front elevation of the nipple shown in Figs. 12 and 14, said nipple having its longitudinal axis vertical.

Fig. 16 is a side elevation of the nipple of Fig. 15.

Figs. 17 and 18 are front and side elevations, respectively, of a modified type of novel nipple which may be used in carrying out my invention.

Figs. 19 and 20, 21 and 22, 23 and 24, 25 and 26, are elevations, similar to Figs. 17 and 18, illustrating other novel types of nipples, for example, which may be used in the practice of my invention.

Figs. 27, 28, 29 and 30 are sections of nipples illustrating how the heads of any of the nipples illustrated in the drawing may be made rotatable with respect to the longitudinal axis thereof.

Fig. 31 is a partial elevation and partial section of a novel type of nipple which may be applied to the part to be lubricated by driving and rotatably held in place by such operation.

Fig. 32 is a partial elevation and partial section showing the nipple of Fig. 31 applied and ready for use.

Fig. 33 is a fragmentary section and elevation of parts of Fig. 32 on an enlarged scale.

Fig. 34 is a fragmentary view showing a modification that may be made in the structure of Fig. 11.

In Fig. 1, I represents the body portion of a fitting having a neck 2 provided with a duct 3 which may be connected with a proper source of lubricant supply. The duct 3 communicates with the cylinder or chamber 4 having its outer end closed as by screw-plug 5. The cylinder 4 contains the slidable piston or plunger 6, the rotation of which is prevented by screw 7 and key way 8, which elements may also limit the travel of the plunger, as desired. The plunger 6 is provided with a passage 9 communicating with the groove or pocket 10 in the face thereof, which is adapted to make sealed contact with the ball-head nipple 11 having the axial duct 12, shown in dotted lines, assumed to be connected with a part to be lubricated, as is now common practice. 13 is a cup washer which may be made of leather or other suitable flexible material to prevent lubricant leaking past piston 6, and may be held in place by spring 14 normally urging the plunger toward the left-hand end of the fitting which is provided with a yoke or bifurcated jaw 15, the members of which are sufficiently separated to span the neck of the fitting 11. The yoke 15 is provided with a seat or pocket, indicated in dotted lines at 16, which engages, and preferably accurately fits, a portion of the surface of the ball nipple 11. The shell 1 is cut away, as indicated at 17, to allow the entrance of the ball fitting 11 between the plunger 6 and jaw 15 when plunger 6 is moved back against the effort of spring 14.

In one of the preferred forms of my invention, the plunger 6 is as shown in elevation in Fig. 2 and has a cylindrical portion 18 and parallel sided extension 19. The nipple contacting face of the plunger is of arcuate form having substantially the same radius as the ball to be engaged, and the lubricant conducting groove 10 therein may be of the form indicated in section (upon the line a—a of Fig. 2) in Fig. 2ª. The groove 10 is preferably of such length that when the neck 2 is in a horizontal position, as shown in Fig. 1, the groove will communicate with the port 12 of nipple 11 and continue thus to do while the fitting is rotated counter-clockwise in a vertical plane about the ball 11, until the neck 2 is in a vertical position; and the contacting edge of the groove 10 is preferably lapped to form a true seat upon a ball of the same diameter as the head of the nipples to be serviced, as indicated at 20 in Fig. 2ª and as more plainly shown in plan in Fig. 3.

In Figs. 4, 5 and 6, a piston or plunger is shown as provided with a yielding gasket which makes sealing contact with the nipple, and the piston is indicated as of cylindrical shape throughout its length to illustrate this form, though the contact end may be shaped, of course, as shown in Fig. 2 or chamfered, if desired. In these figures, 18 indicates the cylindrical body portion of the plunger which is shown of indefinite length to indicate that it may be of any dimensions to meet requirements. In Fig. 4, the parts appear in elevation and the contacting gasket is shown at 21 as partly imbedded in a recess, indicated in dotted lines at 22. The section, Fig. 5, shows clearly how the recess 22 holds the gasket in place; while this figure, taken with the end elevation (Fig. 6), shows how the lubricant-conveying pocket or groove is formed by merely cutting out a portion of the gasket 21 so as to form a slot therein, as indicated at 23.

In the structures of Figs. 1 to 6, incl., the piston travel is in a direction normal to the contacting face and in the vicinity of 45 degrees to the axis of the neck 3, to provide coverage of the port 12 (Fig. 1) by the groove 10 throughout wide angular displacement, as above pointed out. While this arrangement has certain advantages which will later be mentioned, it is often desirable that the nipple-engaging end of the fitting be as small as possible so as to be applicable to nipples in more or less inaccessible places. For this reason it is often preferable to make the fitting of the general type indicated in Fig. 7, where the shell 23 is provided with a plunger 24 having a contacting face 25 at an angle of something in the neighborhood of 35 to 45 degrees (or 145 to 135 degrees) to the axis and travel of the plunger. With this arrangement, the shell or cylinder 23 is provided at the nipple-engaging end with a bifurcated jaw 26, as indicated in Fig. 8, providing a seat 27 for engaging the nipple head which may be entered through the opening 28. The lubricant conducting groove or pocket 10 is indicated in this figure as covering the duct 12 in the vertical nipple 11, shown in full lines, while the nipple is indicated by dotted lines as in a horizontal position to illustrate how the sealed connection is maintained in these relative positions. In the arrangement shown, the lubricant pressure acting upon the right-hand end of plunger 24 is relied upon to cause the sealed contact with the nipple, while leakage is prevented by the cup leather 29.

A preferred form of this type of fitting is indicated in Figs. 9 and 10, wherein the nipple is shown only in dotted lines to expose parts obscured by the nipple in Figs. 7 and 8. In Fig. 9, the seat or pocket 27 and the opening 28 are more clearly shown, while in Fig. 10 the duct 9 and lubricant-conveying channel or groove 10 and its lapped edge or seat 20 are visible. This figure also illustrates how the opening in the bifurcated jaw 26 preferably conforms closely to the shape of the neck of the nipple so that when the longitudinal axes of the nipple and fitting are at angle with respect to each other, except 180 or in line, rotation of the fitting about its longitudinal axis will be prevented so that the channel 10 will always communicate with the port 12 of the nipple whenever they are engaged.

In all of the above fittings, it will be noted that in order to distribute the pressure of the jaw against the ball-head over a reasonable area the pocket in the jaw has to conform to the contour of the ball, and, therefore, the position of the ball when engaged is fixed. Therefore, in order that the contact face of the plunger may properly seat upon the ball and allow for wear and slight irregularities, it is preferable that the plunger have a little play within its cylinder, even in the structure of Fig. 1 where the direction of travel of the plunger is normal to the contact face, and the pressure tending to preserve the seal is in the direction of the arrow in Fig. 2. This play of the piston, obviously, is even more important in the structure of Figs. 7 to 10, inclusive, when the travel of the plunger is not normal to the contact face but may be at an angle in the neighborhood of 45 degrees thereto. It is obvious that these structures would be improved if the pressure tending to preserve the seal were applied in a direction substantially normal to the contact face, as in Fig. 1, while still preserving the smaller dimensions of the nozzle end of the fitting obtained by the structures of Figs. 7 to 10. This object is attained in the structures of Figs. 11, 12 and 14.

In Fig. 11, the cylinder 29 is provided with the clamping jaw 26, having the seat 27 for engaging the ball 11, as in Figs. 7 to 10, incl. The rear end of the cylinder is closed by the threaded member 30 having a neck 31 and duct 32 therethrough which may be connected with a source of lubricant under controllable pressure. The cylinder 29 contains a plunger 33 having an angularly disposed contact face 25, lubricant conveying channel 10 and duct 9, as in Fig. 7. The plunger 33 has a reduced portion 34 fitting loosely within the bore of the member 35, which is freely slidable (with some play) in the cylinder 29, and provided with an extension or bolt 36 having a rounded end 37 contacting with the inclined surface 38 near the forward end of the plunger 33. A spring 39 tends to separate plunger 33 and member 35 while they are held together by the screw 40 having a passage 41 therethrough registering with the passage 9 in plunger 33. A cup leather 42, engaging both the inner wall of cylinder 29 and the head of screw 40, prevents leakage of lubricant past member 35, and may be held against the member 35 by spring 42 which normally urges the member 35 in a left-hand direction; while the travel of member 35 may be limited by screw 44 and key way 35, which arrangement also prevents relative rotation between the cylinder 29 and member 35. The bolt 36 may be loosely fitted into a channel cut in the member 33, as indicated for example in Fig. 11ᵃ, and, of course, may be of the relative dimensions indicated in the figure or may be as much wider or deeper as may be desired to provide requisite strength. The arrangement of the inclined shoulder 38 and the end 37 of the bolt 36 is such that, when a nipple is engaged by the fitting and the bolt is pressed toward the left, it tends (owing to the incline of 38 upon which it is free to slide) to press the contact face 25 upon the ball, in a direction substantially normal to the face, as indicated by the arrow in Fig. 11.

In Fig. 12, the shell 46 is provided with an extension in the form of a hand grip 47 carrying a projection 48, perforated to receive the squared end of the coupling member 49 which may be connected in any convenient manner, as by a hose for example, with a source of lubricant. Coupling 49 connects with the tube 50 having a contracted portion 51 passing through an opening in the member 52, slidably mounted within the shell 46; and the end of tube 51 is screw-threaded into the plunger 53 so as to communicate with the passage 9 thereof which communicates with the lubricant-supplying channel 10. The member 52 is normally pressed against the shoulder 54 by the spring 55, and 52 is provided with a bolt 56, the end of which is rounded and adapted to slidably engage the inclined surface 57 of the plunger 53, as in Fig. 11. The compression spring 58 surrounds the tube 50 and, by being confined between the perforated abutment 59 and the collar 60, tends to move the tube and parts attached thereto in a right-hand direction. The movable hand grip 61 is carried by the shell 46, as upon the pin 62, and is provided with a forked extension spanning the tube 50, one branch of the fork being shown at 63 and the other being indicated as broken away for sake of clearness. The form of the fork 63 is such that pressure of spring 58 tends to separate the grip 61 from the grip 47 and, by drawing tube 50 and the members 52 and 53 toward the right, to move the same until a desired opening is produced for the passage of the head 64 of the nipple 65 between the contact face 66 and the pocket or bearing 67, which may be reached through the opening 68.

In this figure, the head of the nipple is indicated as cylindrical, as shown in a like side elevation in Fig. 16 and in front elevation in Fig. 15, and each side of the bifurcated jaw 68ᵃ is provided with a seat 67 engaging the extensions 69 at each side of the neck 70 of the nipple, as indicated in Fig. 13; and the opening between the said sides of the jaw is sufficient to span the neck of the nipple, as shown at 71 in Fig. 13. Therefore, when the hand grip 61 is released, the fitting may be applied to a nipple and, if the grip be then moved into the position shown in Fig. 12, the nipple will be so engaged as to be supplied with lubricant through the channel 10, even though the fitting be swung through an angle of substantially 90 degrees in a vertical plane. And, drawing of the hand grips toward each other, by urging the bolt 56 against the inclined face 57, will cause the sealing pressure to be applied in a direction substantially normal to the contact face 66 of plunger 53.

In Fig. 14, the shell 46, plunger 53 and hand grips 47 and 61, are similar to the like parts in Fig. 13. However, in this figure, the fork 63 does not act directly upon the member 52 but upon the member 72, separated therefrom by a cavity 73 containing the cup leathers 74 and a spring 75 which acts in a similar manner to spring 43 in Fig. 11. The tube 50 has a shoulder 76, limiting the travel of member 72 under action of spring 75, and the tube 50 also has a port 77 communicating with chamber 73 between the cup leathers 74. The bolt 78 is not attached to the member 52 to indicate this construction may be employed in any of the structures shown. The nipple 65 is indicated as having its longitudinal axis in a horizontal plane to show how the same may be engaged in this position as well as that of Fig. 12, or any position therebetween.

In Fig. 17, the nipple 65 is substantially the same as in Figs. 15 and 16, save that the cylindrical head is contracted on each side of the neck to provide shoulders 79 for engagement in the pockets in the bifurcated jaw of the fitting. In Figs. 19 and 20, this contraction is carried still further until the shoulders resemble pins, as shown at 80; and pins may be used, if desired.

In Figs. 21 and 22, the shoulders are shown as truncated cones 81 of smaller diameter than the cylindrical portion of the nipple, while in Figs. 23 and 24 they are shown at 82 as truncated cones with the bases substantially of the same diameter as the cylinder.

In Figs. 25 and 26, the shoulders 83 are hemispherical in form, and the nipple head 84 is spherical in part.

In all of the nipples shown in Figs. 15 to 26, incl., it will be noted that the portions to be engaged by the pockets in the jaw of the fitting are of circular section at the points of contact with said pockets, and the centers of such sections are on the central axis of the heads of the fittings so that a nipple and fitting may be rotated in a given plane (i. e., the plane of the paper in the drawing) throughout an angle of substantially 90 degrees. With the ball head nipples and fittings as shown in Figs. 1 to 11, incl., the fittings may be rotated about the axis of the nipple, and, of course, this is a desirable feature. By making the engaged portion of the nipples readily rotatable about its own axis, substantially the same result is obtained; and Figs. 27–32, incl., illustrate examples of this type of nipple, it being plain that the heads of the nipples shown in the said figures may be of any form which may be preferred, including the types shown in Figs. 12–26, incl.

In Fig. 27, 85 indicates the head of the nipple which may be of any of the forms shown in the drawing, for example. The neck 86 is provided with a cylindrical shank 87 fitting within the cylindrical opening in the base member 88 and free to turn therein. The shank 87 is formed with a contracted portion 89, over which a leather washer 90 and a metal washer 91 are passed, and then the contracted portion 89 is spun or swaged over the metal washer to hold the same in the position shown.

In Fig. 28, the neck is shown as provided with a contracted portion 92 passing through the base portion 93 and provided with a contracted portion 93ª passing through a washer 94 over which it is turned so as to be held in place. In Fig. 29, the neck 95 is provided with an upwardly extending contracted portion 96 which passes through the head 97 of the nipple. The head is formed with a countersink or recess at 98 into which the metal of the portion 96 is forced, and then the surface trued as shown in the figure, so that the head may turn freely about the neck.

In Fig. 30, a similar structure is shown but the portion 96 has a contracted end 98ª which fits the reduced bore in the head. The reduced portion 98ª is preferably "headed" into a recess or counter-sink in the head, and then the head is properly trued up.

In Fig. 31, the nipple head 99 may have any desired shape, and the neck 100 is provided with a shank 101 which has the sleeve 102 placed over it and is then "headed" over the end of the sleeve, as shown at 108, so as to be held in rotatable relation thereto. The upper end of the sleeve 102 is cut away so as to leave a groove 103 surrounding the shank 101, while the lower side of the neck flange 104 is provided with a contracted portion or shoulder 105.

Fig. 32 shows the nipple of Fig. 31 in place. The bore 106 in the part to be lubricated is arranged to fit the sleeve 102 and allow insertion thereof until shoulder 105 strikes the metal of the part. A tool engaging the upper side of flange 104 is then struck a blow and the shoulder 105 causes the metal of the part to "flow" into the groove 103 (see also Fig. 33) sufficiently to hold the nipple in place against the pressure reaction in high pressure service, as indicated at 107 in Fig. 33.

Fig. 34 illustrates a modification that may be made in the structure of Fig. 11 so as to reduce the area acted upon by the lubricant pressure tending to clamp the fitting upon the nipple. Here, the member 35 has an extension 109 of less area than the member 35, and the lubricant pressure acts against this reduced area instead of against 35 as in Fig. 11.

An operation of my invention is substantially as follows:

If a vertical nipple, as shown in Fig. 1, is to be serviced with the type of fitting shown in that figure, the fitting may be placed with the opening 17 over the head of the nipple and thrust against the ball head in such manner as to push the portion 6 back against the effort of spring 14 so as to allow the head 11 to enter and take the position in pocket 16 as shown, whereupon spring 14 will move the piston into the position indicated and tend to hold the same in contact with the ball so as to cause a fluid-tight joint. If lubricant then be forced through duct 3 and into chamber 4, it will tend to pass through port 9 and channel 10 and port 12 to the part to be lubricated; and, as the area of piston 6 is much larger than the area of the ball covered by the channel 10, increasing the pressure upon the supply of lubricant will cause the contact pressure to increase in such manner as to preserve a fluid-tight seal throughout pressure increases, in a now well-known manner. As the jaw 15 has an opening wide enough to span the neck of the nipple, a nipple in a horizontal position (as indicated in dotted lines in Fig. 7) may be engaged in substantially the same manner, and its port 12 will still be covered by the channel 10 so that it may be serviced as above, with all of the advantages flowing from this characteristic which will not be mentioned here as they are now well-known in the art.

The fitting of Fig. 11 may be applied in a similar manner and springs 43 and 39 will tend to hold the fluid-tight joint between the channel 10 and ball 11. As lubricant is forced through duct 32 into the cylinder it will pass through port 41 in screw 40 and duct 9 to the channel 10, and tend to pass through the port 12 to the part to be lubricated. Owing to the spring pressure upon the contact, pressure will build up behind the cup leather 42 and tend to force the same toward the left. This will tend to move member 35 and bolt 36 toward the left, against the effort of spring 39, and as bolt 36 thus moves, its end 37 will be wedged between the cylinder wall and inclined surface 38 in such manner as to press the contacting edge of channel 10 against the ball 11 in the direction of the arrow, or normal to the contact face. It is usually preferable, though not necessary, to make spring 39 stiffer than spring 43 so that when the lubricant pressure is released the bolt 36 will be drawn back enough to withdraw its wedging action against the surface 38. The fitting, then, can be readily removed from the nipple by pushing the shell 29 forwardly until the ball head registers with the opening 28, and then raising the fitting. As the area of the channel 10 is quite small compared with the area of the member 35 in the structure of Fig. 11, more clamping pressure can be exerted by this arrangement than is often necessary. Therefore, it is often desirable to reduce the clamping pressure, particularly when the resilient gaskets of Figs. 4, 5 and 6 are used. This may readily be accomplished by the construction shown in Fig. 34, wherein the member 35 is provided with a contracted portion 109 against which the lubricant pressure acts.

With the structure of Fig. 12, if one holding the hand grips 47 and 61 allow the grips to separate, spring 58 will move the tube 50, member 52, bolt 56 and piston 53, toward the right until the head of the nipple can be entered through opening 68 and seated in its pocket 67. Then, if the grips be drawn together, the piston 53 will make contact with the head of the nipple, as indicated in the figure, and further force applied to close the hand grips will cause member 52 to advance against the effort of spring 55 and, by moving the holt 56, cause it to act against the surface 57 to press the contact face of the piston toward the nipple head, in a direction normal to the said face. If lubricant be then supplied under pressure through coupling 49, the nipple may be serviced; and, when the operation is completed, if the hand grips be allowed to separate, the nipple may be disengaged, in an obvious manner.

With the structure of Fig. 14, operation of the hand grips, as in Fig. 12, will control the engaging and disengaging movements of the piston 53, in an obvious manner, in view of the above described operations of Figs. 11 and 12. However, when the nipple is engaged and lubricant forced through tube 50, it will tend to flow through the nipple and also from port 70 into chamber 73, where it will act upon member 52 to apply sealing pressure through the instrumentality of member 78, in a direction normal to the face 66 of the piston 53, as in the structure of Fig. 11.

While I have shown the nipple-engaging pistons in Figs. 1, 7, 11, 12 and 14, as making a metal to metal contact with the nipple, it is obvious that pistons provided with yielding gaskets, as shown in Figs. 4, 5 and 6, may be used in any of these structures.

Further, it will be noted that, since the pistons which I have shown as in operative connection with ball-head nipples have accurate faces, they may be used either in contact with spherical or cylindrical surfaces if the dimensions be properly chosen; and that, while I have shown ball nipples in Figs. 1, 7, 8, 9, 10 and 12, and cylindrical head nipples in Figs. 12 and 14, the structures may be made for use with either kind of nipple.

With the fitting engaged with a ball-head nipple, it can be rotated upon the head about the longitudinal axis of the nipple without interfering with the seal; while, of course, this is not true when the types of nipples shown in Figs. 12 to 26, incl., are used. However, any of these may have their heads rotatable, as shown in Figs. 27 to 33, incl., and the rotatable features will be present.

While I have shown the nipples in Figs. 12, 13 and 14, as having cylindrical heads of the type shown in Figs. 15 and 16, it is obvious that, if the pockets 67 in the jaw 68ª be of proper form, any of the modifications shown in Figs. 17 to 26, incl., may be used; and as, in the structures of these last-mentioned figures, the portions fitting the pockets are smaller in diameter than the shoulders 69 of the nipple of Figs. 15 and 16, the pockets and jaw may be more easily made as more metal may be left in the jaw.

While, for sake of simplicity, each of the nipples shown in the drawings is provided with an open passage or duct 12 therethrough, it is obvious that any of the now well-known valved passages may be provided, if desired, without in any way departing from my invention. And, while in each fitting here illustrated, I have shown my improved contact piston having a non-circular outlet opening, it is plain that means for applying the contact pressure at an angle to the direction of normal travel of the piston, or direction of the fluid pressure, may be used with any type of piston without departing from my invention.

I do not wish in any way to be understood as limiting my invention to any of the specific structures or modes of operation herein given to illustrate embodiments of my invention for wide departure may be made in the way of apparatus and modes of operation without departing from the spirit and scope of my invention, which is as set forth in the following claims.

I claim:

1. Lubricating means for use with a nipple, including means for engaging a portion of said nipple and means cooperating with said last-named means clampingly to hold and form a fluid-conveying sealed connection with said nipple and having a portion with a non-circular opening surrounded by a narrow contact area making a fluid-tight joint with said nipple throughout motion of said cooperating means with respect to said nipple throughout a solid angle of substantially a hemisphere.

2. Lubricating means for use with a nipple having a convex perforated surface, including means for engaging said nipple, and cooperating movable means adapted to contact with said surface and form a fluid-tight seal, the contact face of said movable means being perforated by an elongated slot covering the perforation in said nipple and surrounded by a narrow contact area pressed against said convex surface.

3. Lubricating means for use with a nipple having a convex perforated surface, including means for engaging said nipple, and movable means adapted to contact with said surface and through cooperation with said engaging means form a fluid-tight seal, the contact face of said movable means being perforated by an elongated slot covering the perforation in said nipple and surrounded by a relatively narrow contact area pressed toward said nipple by lubricant pressure.

4. Lubricating means for use with a nipple having a convex perforated surface, including means for engaging said nipple, and movable means adapted to contact with said surface and coact with said engaging means to form a fluid-tight seal, the contact face of said movable means being perforated by an elongated slot covering the perforation in said nipple and being pressed toward said nipple by lubricant pressure and means for applying lubricant pressure to said movable means in a direction other than that of said lubricant pressure.

5. Lubricating means for use with a nipple having a convex perforated surface, including means for engaging said nipple, and movable means adapted to contact with said surface and coact with said engaging means to form a fluid-tight seal, the contact face of said movable means being perforated by an elongated slot covering the perforation in said nipple and surrounded by a relatively narrow contact area pressed toward said nipple by lubricant pressure in a direction substantially normal to said contact face.

6. Lubricating means including nipple clamping means operated by lubricant pressure and means for modifying the effective direction of said pressure.

7. Lubricating means including nipple engaging means and means cooperating therewith to form a sealed connection with a nipple when engaged, said last-named means comprehending a plunger with an inclined face and means for urging the plunger against the nipple in a direction substantially normal to the incline of said face.

8. Lubricating means including nipple-engaging means and a cooperating plunger with an inclined face and means for operatively urging said plunger in a direction substantially normal to the incline of said face.

9. Lubricating means including a clamping jaw and cooperating plunger with an inclined face and means affected by lubricant pressure for urging said plunger in an operative direction substantially normal to the incline of said face.

10. Lubricating means including a plurality of relatively movable members adapted to approach one another clampingly to engage a nipple and means for applying useful clamping pressure in a direction other than that of said approach.

11. Lubricating means including a fitting having relatively movable members adapted clampingly to engage a nipple therebetween and means for varying the direction of clamping pressure.

12. Lubricating means including nipple clamping means operated by lubricant pressure and means for modifying the effect of useful said pressure to alter the direction of pressure applied by the clamping means.

13. Lubricating means including clamping means comprehending engaging means and a cooperating contact nozzle having a contacting member with a non-circular opening therethrough surrounded by a relatively narrow contact area adapted to form fluid-tight contact with and service a ball type nipple throughout solid angular displacement about the center of said ball.

14. Lubricating means including clamping means comprehending engaging means and a cooperating contact nozzle having a contacting member with a non-circular opening therethrough surrounded by a relatively narrow contact area adapted to form fluid-tight contact with and service a ball type nipple throughout wide angular displacements.

15. Lubricating means for use with a nipple, including means for engaging the nipple, lubricant conveying means for forming a servicing connection with said nipple including a movable member cooperating with the engaging means to clamp said nipple and having a contacting face forming a seal with said nipple, means operated by lubricant pressure for exerting pressure in a useful direction upon said seal, and means for exerting additional useful pressure thereupon in another direction.

16. Lubricating means including a pressure-operated sealing device adapted to make a fluid-tight seal with a convex surface and having a resilient member contacting with said surface and provided with a lubricant feeding slot of a length several times the width thereof.

17. In a coupling device of the type wherein a plurality of relatively movable members clamp a nipple therebetween and wherein one of said members is adapted to form a fluid-conveying contact joint with said nipple and wherein the main component of fluid pressure reaction tending to break said joint is in a direction along a given axis of said device, means for moving said contact member with respect to another of said movable members in a direction other than along said axis clampingly to engage the fitting and means for exerting clamping pressure in a direction along said axis.

18. Lubricating means for use with a nipple having a convex perforated surface, including lubricant applying means, having a bore, for engaging said nipple, said means having a recess adapted to contact with a portion of said surface and form a fluid-tight seal, the contact face of said means having an elongated slot terminating inwardly of the edges of the recess and forming a passageway for lubricant between the bore of the applying means and the perforation in the surface of the nipple.

JOHN L. CREVELING.